D. T. PHILLIPS.
AGRICULTURAL APPARATUS.
APPLICATION FILED JUNE 14, 1912.
1,113,684.
Patented Oct. 13, 1914.
2 SHEETS—SHEET 1.
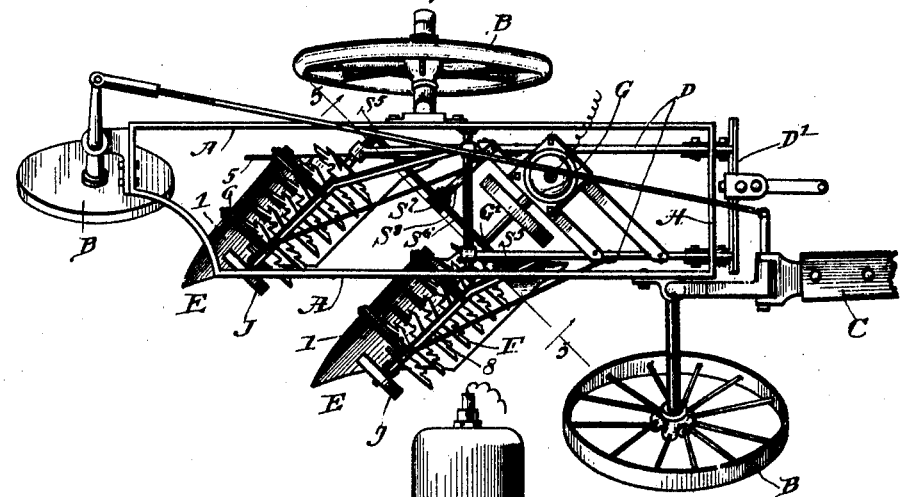
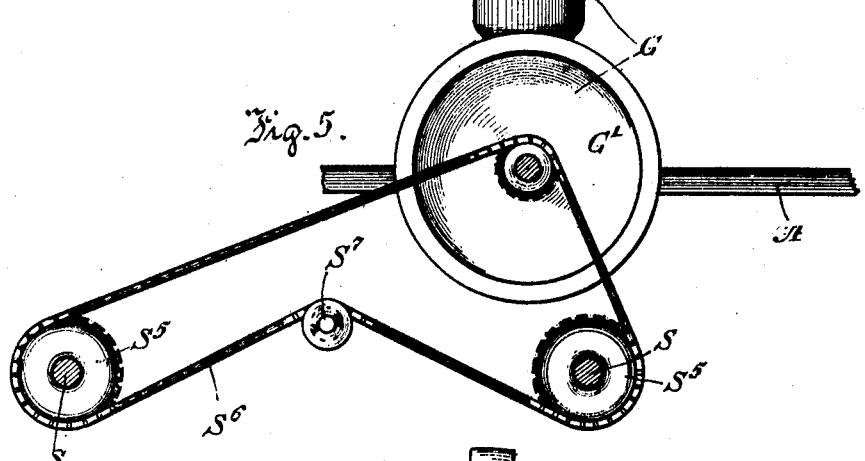
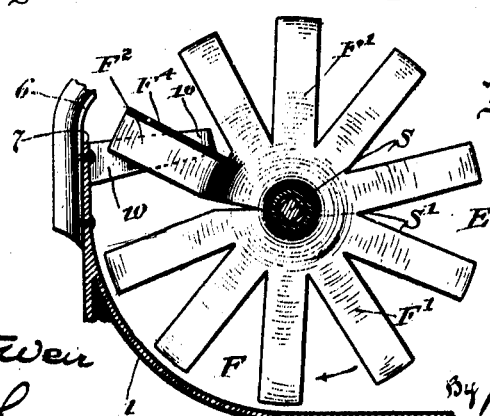
Witnesses
Robert H. Weir
W. T. Smith
Inventor
Darius T. Phillips
By Browne & Hopkins
Atty.

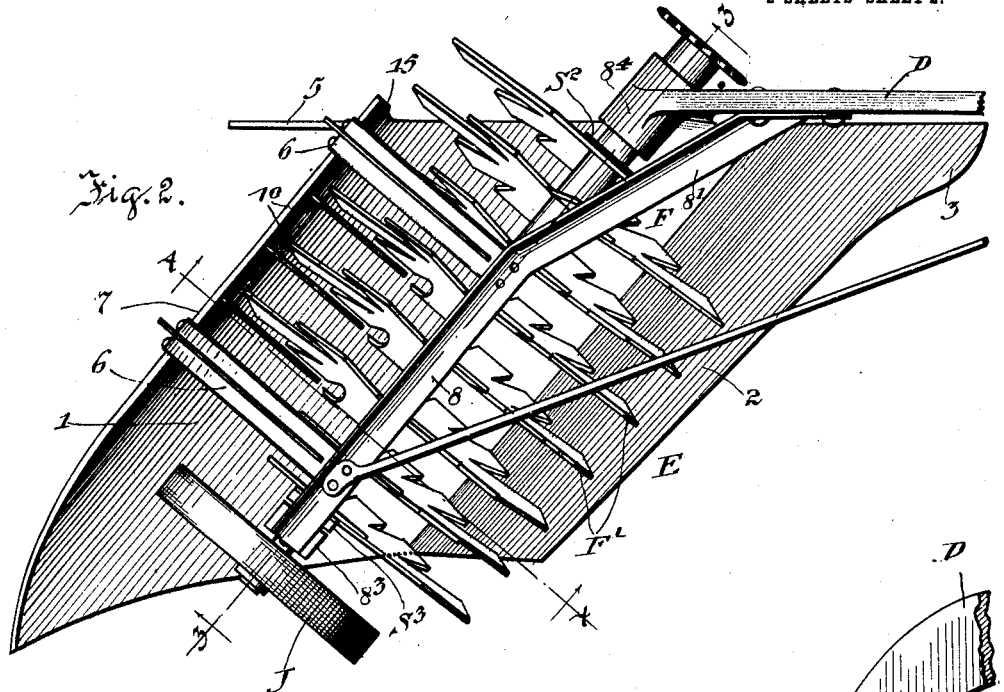
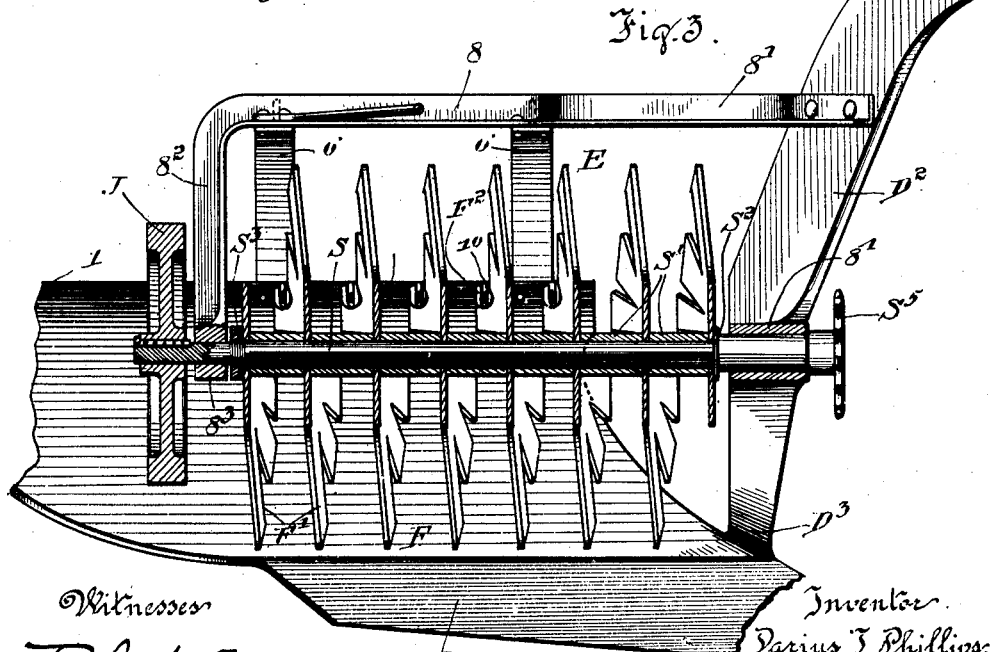

UNITED STATES PATENT OFFICE.

DARIUS T. PHILLIPS, OF CHICAGO, ILLINOIS.

AGRICULTURAL APPARATUS.

1,113,684. Specification of Letters Patent. Patented Oct. 13, 1914.

Application filed June 14, 1912. Serial No. 703,619.

*To all whom it may concern:*

Be it known that I, DARIUS T. PHILLIPS, a citizen of the United States, residing at Chicago, in the county of Cook and State of Illinois, have invented certain new Improvements in Agricultural Apparatus, of which the following is a specification.

My invention relates to improvements in agricultural machines or implements, and has more particular reference to machines or apparatus for preparing the ground for planting or seeding purposes.

Primarily the object of my invention is to provide an improved machine which will, in one operation, rapidly and effectively alter or change the condition of the ground or earth from its after-harvest solid or massed condition to a granulated or pulverized condition, ready to be planted or seeded.

A further object of my invention is to provide an improved machine or apparatus of this character which will be simple, strong and reliable in construction and capable of withstanding the abuses to which apparatus of this character is subjected, and which will be effective and efficient and require a minimum amount of power for its operation.

To the attainment of these ends and the accomplishment of other new and useful objects, hereinafter appearing, my invention consists in the features of novelty in the construction, combination and arrangement of parts herein described and shown in the accompanying drawings which illustrate one embodiment of my invention, and more particularly set forth in the appended claims.

In the drawings—Figure 1 is a general top plan view of a structure embodying my invention. Fig. 2 is an enlarged top plan view of one of the unit implements or apparatus structures embodying my invention. Fig. 3 is a view in elevation thereof looking at the front of the structure in a direction substantially at right angles to the view illustrated by Fig. 2, part of said structure being shown in section substantially on the line 3—3 of Fig. 2. Fig. 4 is a partial transverse section substantially on a line 4—4 of Fig. 2, and Fig. 5 is in a sense a diagrammatic view of the engine and driving connections for the several rotating parts of the apparatus.

In the drawings I have illustrated my invention in connection with a structure embodying a wheeled mounting or supporting frame drawn by the usual farm draft animals, and in connection with that type of apparatus known as gang apparatus, wherein unit operating parts are multiplied for the purpose of handling a greater width or tract of land as the apparatus travels. It will be understood, however, by one skilled in the art after having obtained an understanding of my invention from the disclosures herein made, that my invention is not limited or restricted in any sense to the structure herein described and shown, but on the contrary is readily adaptable to various other structures which operating and manufacturing conditions determine to be best suited to particular requirements.

In the drawings the operating parts are illustrated as being mounted upon or supported by a frame A which resembles an ordinary gang plow frame in that it has several supporting wheels B and the usual tongue or shaft C connected to some of the wheels in such manner as to turn properly on curves or corners. I have also shown a pair of beams D similar to gang plow beams, mounted upon the frame and having a cross member $D^1$ at their forward ends to which the draft animals may be hitched. The beams D may be pivotally mounted similar to gang plow beams upon the frame, so that the operating parts may be raised and lowered as desired. The drawings illustrate a structure having a gang of two operating units or mechanisms E, but it will be understood, of course, that the number of units in the gang and in their particular relative arrangement may be determined by various factors, such as the width or strip of land to be handled. Since these operating units are similar, a description of one of them in detail will be sufficient.

It will be seen that the rear ends of the supporting beams D turn downwardly, and it is upon the depending ends $D^2$ which I prefer to mount the operating mechanisms. Upon the extreme lower ends $D^3$ of the beams is a peculiarly formed member F which extends or projects generally horizontally and which is disposed in a general angular direction to the direction of travel of the apparatus. This member F resembles and preferably is formed like the share and mold board of a plow. It has a broad upwardly curved portion or mold-board 1, the forward portion or edge 2 of which drops at a sharper angle downwardly than the mold-board and terminates at its extreme forward end 3 in a sharp point which facilitates the cutting of the earth and the formation of a furrow as the apparatus travels. This plow-like member F may, in addition, have a land side 5 when used as the last or outer end member of the gang of series of units, this landside being generally omitted on the remaining or forward members, as illustrated in Fig. 1. The mold-board portion 1 is preferably curved upwardly on the arc of a circle, as shown in section in Fig. 4. It is supported rigidly in relation to the beam by a couple of suitably curved braces 6 which extend from the rear upper edge 7 of the mold-board to the bridge beam or member 8. A portion of this bridge beam, as will be seen, lies above the apparatus substantially in the line parallel with the general longitudinal axis of the plow like member F, and another portion $8^1$ thereof inclines more sharply forward to the beam D to which it is firmly attached, the purpose of this arrangement being to rigidly brace and strengthen the entire structure. The outer end $8^2$ of the bridge beam drops or turns downwardly into a vertical position and forms at its lower end a bearing $8^3$ for a horizontal shaft S. The other end of this shaft is journaled in a suitably formed bearing $8^4$ in the beam D. The shaft preferably lies in the axial center of the curve or arc of the mold-board portion 1, as before intimated. This shaft carries a rotary mechanism or granulating device, which in this embodiment of my invention is preferably made in the form of a spiral cutter. This mechanism is preferably arranged to rotate rearwardly and upwardly away from the forward lower or cutting edge portion 2 of the member F, as indicated by the arrow in Fig. 4. This mechanism operates in such manner that, as the plow-like member F forms a furrow in the ground and turns the broken earth over upon itself, the rotary cutting mechanism takes the broken earth and by means of a spiral action moves it along the mold-board toward the outer end thereof, at the same time pulverizing or granulating it to such condition that when the pulverized earth leaves the outer end portion of the mold-board and again drops upon the ground it will be in condition to be planted without further manipulation. For the purpose of more effectively cutting or granulating the earth I provide the spiral or rotary mechanism with a plurality of radially disposed teeth or cutting knives $F^1$ (Fig. 4) which, as is seen, extend or project almost into contact with the mold-board, but which sufficiently clear the mold-board as to not interfere therewith. My invention has another important advantage in the fact that it not only reduces the earth to a finely granulated or pulverized condition, but it also cuts any stalk or other similar material usually found on cultivated land, into fine pieces to such an extent that they do not interfere with the planters or other agricultural apparatus which goes over the ground afterward. To facilitate the cutting of the stalk I provide a series of stationary cutting blades 10, which are secured to the mold-board, and which operate as shears in conjunction with the knives or teeth $F^1$ of the rotary mechanism. As shown more particularly in Fig. 4, these stationary knives are inclined upwardly so as to facilitate the cutting or shearing action which takes place. These stationary knives also serve to dislodge the dirt or stalks which might otherwise become lodged between the spirals of the rotary mechanism and be carried up and over again on the forward portion of the plow-member F. In other words, they serve to clear the rotary mechanism of any particles which become lodged therein.

To facilitate the manufacture of the rotary spiral cutting mechanism I prefer to construct it by building it up of a number of individual or separate disks, as illustrated more clearly in Fig. 3. These disks may be formed by any suitable manufacturing method and spaced apart on the shaft S by spacing sleeves $S^1$. One end of the series of disks on the shaft may bear against a shoulder $S^2$, and a suitable clamping pressure may be obtained to hold the disks firmly on the shaft by threading the outer end portion of the shaft and providing a set of clamping or pressure nuts $S^3$. The portion of the shaft between the clamping nuts $S^3$ and the shoulder $S^2$, occupied by the disks, may be squared in section, as shown in Figs. 3 and 4, so that the disks may be securely mounted upon the shaft against relative rotation thereon.

In forming the cutters the teeth or cutting knives $F^1$ thereof may be offset so that one disk will form a continuation, so to speak, of the other adjacent disk and a progressive spiral thereby produced. In order that some of the teeth or knives of the rotary mechanism may properly coöperate with the stationary knives 10, a corresponding tooth or knife $F^2$ may be offset slightly more than the other teeth in such manner as to pass close to or in sliding contact with the stationary knives 10. And these offset teeth $F^2$ may, if desired, be given sharpened cutting edges $F^4$, as clearly shown in Fig. 4.

While I might gear or connect the rotary cutting or pulverizing mechanisms with the supporting wheels B of the apparatus to secure the necessary power to rotate them, I find that this method is more or less unsatisfactory, especially where more than one unit is used, and I prefer instead to drive the rotary mechanism by a separate source of power, such as a gasolene engine G, mounted upon the frame A of the apparatus. In Figs. 1 and 5 I have illustrated one way in which these mechanisms may be connected with and driven from a single engine. It will be seen that in mounting a gang of these units upon the frame, one unit is positioned in the rear of the one in front in such manner that the forward end of one unit is substantially transversely alined with the inner rear end 15 of the mold-board of the unit immediately preceding it. The shafts S, however, of all the units are parallel, and by providing suitable sprockets $S^5$ on the inner end of the several shafts a single driving chain $S^6$ may be used. As shown more clearly in Fig. 5 this chain may extend around a sprocket $G^1$ on the engine shaft, and from thence around the several sprockets $S^5$ of the shafts S, the engine being generally angularly disposed on the frame, as shown in Fig. 1, to facilitate and properly line up with these several driving connections. I provide an idler $S^7$ on a suitable arm or member $S^8$ of the frame for the purpose of raising the lower reach of the chain between the units, so as to more effectively clear the operating parts and allow sufficient slack in the chain to allow for the raising and lowering of the several unit mechanisms. I find that a decided advantage is gained in the action of the rotary cutters by providing a suitable fly wheel J on each of their shafts S, preferably at the other ends of said shafts. These fly wheels should be heavy enough and properly proportioned and balanced, and their effect is to steady the cutting and pulverizing action of the rotary cutters. The effect is much more pronounced when the fly wheels J are placed directly in the shafts S. It is obvious, however, that the rotary cutting mechanism may be driven in any suitable manner found best adapted to the particular requirements.

What I claim is:—

1. An agricultural machine of the class described, comprising an earth digging and loosening member formed to receive the loosened earth, in combination with a rotary spiral pulverizing mechanism disposed above said member with its axis in the general line of movement of the earth along said digging member; and adapted to reduce the loosened earth to pulverized condition and positively discharge it beyond the line of travel of said digging member, stationary cutters projecting from said digging member into the general confines of said spiral mechanism for cutting stalks and other material and clearing said stalks and other material from said spiral mechanism, and a traveling supporting frame for said parts.

2. A mechanism for agricultural apparatus comprising an earth digging and loosening device having a receiving portion upon which the earth is thrown, in combination with a rotary cutter mechanism positioned to positively force the loosened earth along said receiving portion and pulverize it, stationary cutters projecting into shearing relation with said rotary cutter mechanism, and a fly wheel directly connected to said rotary pulverizing mechanism for steadying the action thereof.

3. In agricultural apparatus of the class described, the combination of an earth digging and loosening member adapted to be propelled along and having a curved receiving board upon which the earth is thrown by said digging member, a rotary pulverizing mechanism having a plurality of spirally arranged cutters adapted to expel the earth from said board and simultaneously reduce it to a pulverized condition, and a plurality of stationary cutters coöperating with said rotary cutters for cutting stalks and other material and for clearing said rotary cutters of articles which become lodged between.

4. In agricultural apparatus of the class described, the combination of an earth digging and loosening member adapted to be propelled along and having a curved receiving board upon which the earth is thrown by said digging member, a rotary pulverizing mechanism having a plurality of spirally arranged cutters adapted to expel the earth from said board and simultaneously reduce it to a pulverized condition, and a plurality of stationary cutters coöperating with said rotary cutters for cutting stalks and other material and for clearing said rotary cutters of articles which become lodged between, and a fly wheel directly connected to said rotary pulverizing mechanism.

5. In an agricultural apparatus of the class described, the combination of a traveling earth digging and loosening member diagonally disposed with respect to the line of travel thereof and having an upwardly curved mold board portion for receiving from said member the loosened earth, a rotary pulverizing mechanism operating adjacent to said mold board portion and having a plurality of cutting knives arranged in a spiral, and adapted to work the loosened earth along said mold board portion and simultaneously reduce it to pulverized condition, and a plurality of stationary cutting knives coöperating with said spirally disposed cutting knives and adapted to shear stalks and similar articles.

6. In an agricultural apparatus of the class described, the combination of a traveling earth digging and loosening member diagonally disposed with respect to the line of travel thereof and having an upwardly curved mold board portion for receiving from said member the loosened earth, a rotary pulverizing mechanism operating adjacent to said mold board portion and having a plurality of cutting knives arranged in a spiral, and adapted to work the loosened earth along said mold board portion and simultaneously reduce it to pulverized condition, a plurality of stationary cutting knives coöperating with said spirally disposed cutting knives and adapted to shear stalks and similar articles, a wheeled frame supporting said parts, and an engine mounted upon said frame and connected to said rotary mechanism for driving the same.

7. In agricultural apparatus of the class described, the combination of a traveling wheeled frame, a depending beam thereon, an earth digging and loosening member supported by said beam and disposed diagonally with respect to the line of travel of said apparatus, said member having a diagonally disposed upwardly curved mold board portion upon which the loosened earth is thrown by said digging member, a shaft disposed substantially parallel with said curved mold board portion and having a plurality of radially disposed cutting knives arranged in spiral form, a plurality of stationary knives outstanding from said mold board and adapted to coöperate with some of said radial knives to shear stalks and similar material thrown upon said mold board, an engine mounted upon said frame, a driving connection between said engine and said shaft for rotating said shaft and causing the loosened earth thrown upon said mold board portion to be pulverized by said knives, and a fly wheel directly mounted upon the shaft for steadying the operation of the knives.

8. The combination of a broad curved plow member upon which the earth is turned as it is dug thereby and a rotary series of cutters arranged in a progressive spiral with their ends working in close proximity to said plow member, operating to pulverize the earth thrown upon said plow member and positively eject it therefrom, and cutting blades outstanding from said plow member into shearing relation with said rotary blades.

9. An agricultural machine of the class described comprising an earth digging and loosening member formed to receive the loosened earth, in combination with a rotary pulverizing mechanism disposed adjacent said member with its axis in the general line of movement of the earth along said digging member and being adapted to reduce the loosened earth to pulverized condition, and stationary cutting means adjacent said pulverizing mechanism and coöperating therewith for cutting stalks and other material and clearing said stalks and other material from said pulverizing mechanism.

In testimony whereof I have signed my name to this specification, in the presence of two subscribing witnesses, on this 12th day of June A. D. 1912.

DARIUS T. PHILLIPS.

Witnesses:
 CHARLES H. SEEM,
 EDGAR FRANCIS BEAUBIEN.